US006945654B2

(12) United States Patent
Newell et al.

(10) Patent No.: US 6,945,654 B2
(45) Date of Patent: Sep. 20, 2005

(54) COLOR MANAGEMENT SYSTEM HAVING A PRISM TO COMPENSATE FOR OPTICAL ABERRATIONS AND TO ENHANCE CONTRAST

(75) Inventors: Michael Newell, Thousand Oaks, CA (US); Clark Pentico, Simi Valley, CA (US)

(73) Assignee: JDS Uniphase Corporation, San Jose, CA (US)

( * ) Notice: Subject to any disclaimer, the term of this patent is extended or adjusted under 35 U.S.C. 154(b) by 14 days.

(21) Appl. No.: 10/794,251

(22) Filed: Mar. 5, 2004

(65) Prior Publication Data

US 2004/0169824 A1 Sep. 2, 2004

Related U.S. Application Data

(63) Continuation-in-part of application No. 10/213,505, filed on Aug. 6, 2002, now Pat. No. 6,851,812.
(60) Provisional application No. 60/310,077, filed on Aug. 6, 2001.

(51) Int. Cl.[7] .............................................. G03B 21/14
(52) U.S. Cl. ............................. 353/81; 353/69; 353/31; 353/20
(58) Field of Search .............................. 353/31, 33, 34, 353/37, 69, 70, 81; 349/5, 7, 8, 9; 359/630, 634, 637, 638, 639, 640, 496, 499

(56) References Cited

U.S. PATENT DOCUMENTS

| 3,637,308 A | 1/1972 | Van Raalte et al. |
| 3,868,168 A | 2/1975 | DeVeer |
| 3,982,819 A | 9/1976 | Letellier |
| 4,864,390 A | 9/1989 | McKechnie et al. |
| 5,231,431 A | 7/1993 | Yano et al. |
| 5,268,775 A | 12/1993 | Zeidler |
| 5,295,009 A | 3/1994 | Barnik et al. |
| 5,315,330 A | 5/1994 | Hamada |
| 5,327,289 A | 7/1994 | Watanabe et al. |
| 5,374,968 A | 12/1994 | Haven et al. |
| 5,486,881 A | 1/1996 | Hwang |
| 5,552,922 A | 9/1996 | Magarill |
| 5,562,334 A | 10/1996 | Wortel |
| 5,621,486 A | 4/1997 | Doany et al. |
| 5,658,060 A | 8/1997 | Dove |
| 5,701,203 A | 12/1997 | Watanabe |
| 5,917,561 A | 6/1999 | Hatanaka |
| 5,946,114 A | 8/1999 | Loiseaux et al. |

(Continued)

FOREIGN PATENT DOCUMENTS

| EP | 0 658 794 | 12/1994 |
| WO | 99/19758 | 4/1999 |
| WO | 00/63738 | 10/2000 |
| WO | 01/37030 | 5/2001 |
| WO | 01/50178 | 7/2001 |
| WO | 01/72048 | 9/2001 |

OTHER PUBLICATIONS

International Search Report, PCT/US02/2501, dated Dec. 2, 2002.
Written Opinion, PCT/US02/2501, dated Apr. 17, 2003.

Primary Examiner—William C. Dowling
(74) Attorney, Agent, or Firm—Allen, Dyer, Doppelt Milbrath & Gilchrist, P.A.

(57) ABSTRACT

A color management system for use with projection displays includes a beamsplitter positioned to receive a light beam, a microdisplay positioned to receive the light beam from the beamsplitter and emit a modified light beam to the beamsplitter, and a plurality of prisms positioned to receive the modified light beam from the beamsplitter and emit a light output that compensates for an optical aberration induced by the beamsplitter.

22 Claims, 10 Drawing Sheets

U.S. PATENT DOCUMENTS

| | | |
|---|---|---|
| 5,973,759 A | 10/1999 | Itoh et al. |
| 6,120,153 A | 9/2000 | Ohta |
| 6,176,585 B1 | 1/2001 | Koyama et al. |
| 6,176,586 B1 | 1/2001 | Hirose et al. |
| 6,183,090 B1 | 2/2001 | Nakanishi et al. |
| 6,183,091 B1 | 2/2001 | Johnson et al. |
| 6,231,190 B1 | 5/2001 | Dewald |
| 6,234,634 B1 | 5/2001 | Hansen et al. |
| 6,273,568 B1 | 8/2001 | Okuyama |
| 6,309,071 B1 | 10/2001 | Huang et al. |
| 6,384,972 B1 | 5/2002 | Chuang |
| 6,419,362 B1 | 7/2002 | Ikeda et al. |
| 6,454,416 B2 | 9/2002 | Aoto et al. |
| 6,457,831 B1 | 10/2002 | Chuang et al. |
| 6,490,087 B1 | 12/2002 | Fulkerson et al. |
| 6,513,934 B1 | 2/2003 | Okuyama |
| 6,585,378 B2 | 7/2003 | Kurtz et al. |
| 6,601,957 B2 | 8/2003 | Sugawara |
| 6,624,862 B1 | 9/2003 | Hayashi et al. |
| 6,626,540 B2 | 9/2003 | Ouchi et al. |
| 6,661,475 B1 | 12/2003 | Stahl et al. |
| 6,678,015 B2 | 1/2004 | Yi et al. |
| 6,685,322 B2 | 2/2004 | Sawamura et al. |
| 2002/0105602 A1 | 8/2002 | Pan |
| 2002/0191289 A1 | 12/2002 | Chuang |

Dual PBS to minimize stress birefringence caused by uneven thermal loading

COLOR MANAGEMENT SYSTEM HAVING A PRISM TO COMPENSATE FOR OPTICAL ABERRATIONS AND TO ENHANCE CONTRAST

CROSS REFERENCE TO RELATED APPLICATIONS

This application is a continuation-in-part of application Ser. No. 10/213,505, filed on Aug. 6, 2002, now U.S. Pat. No. 6,851,812, which claims benefit of priority from U.S. Provisional Application No. 60/310,077, filed on Aug. 6, 2001, which is hereby incorporated by reference.

FIELD OF THE INVENTION

The present invention relates generally to color management systems for projection displays, and more specifically to color management systems having a prism for reducing optical aberrations and enhancing contrast.

BACKGROUND OF THE INVENTION

In conjunction with projection displays, it is desirable to employ a color management system, and it is further desirable that such color management systems facilitate production of a high contrast image while accommodating a relatively high level of illuminating flux. Unfortunately, currently existing color management systems are capable of achieving increased contrast at practical levels of illuminating flux levels only by employing highly specialized materials, resulting in unreasonable increases in cost.

A color management system may function by first separating input light (e.g., white light) into a plurality of color channels traversing the visible spectrum (e.g., red, green and blue) then using the separate color channels to illuminate a plurality of corresponding microdisplays (e.g., Liquid Crystal on Silicon (LCoS), Micro Electro Mechanical (MEM), High Temperature PolySilicon (HTPS), etc. microdisplays) and recombining the color channels to produce an output light (e.g., white light). Where it is desired to project an image in conjunction with the output light beam, spatial information may be superimposed on each of the color channels by the microdisplays prior to recombination. As a result, a full color image may be projected with the output light beam. As used herein, the terms "microdisplay," "panel," and "light valve" refer to a mechanism configured for receiving an incipient light beam, imparting spatial information in the light beam, and emitting a modified light beam comprising the incipient light beam and the spatial information. For example, model number DILA SX-070 manufactured by the JVC company of Japan.

Prior art color management systems have thus far proven unable to produce high contrast images at low cost without compromising their ability to maintain reasonable quantities of illuminating flux. This is due in part to use of solid "cube-type" polarizing beamsplitters for color separation and recombination. These polarizing beamsplitters are otherwise referred to as MacNeille prisms or cube polarizing beamsplitters. "Cube type" polarizing beamsplitters are inherently susceptible to thermal gradients that typically arise at high flux levels, often causing stress birefringence which results in depolarization of the light and a loss of contrast. As a result, where high contrast images are required, is has been necessary to use costly high-index, low-birefringence glass. Although this solution has proven effective to reduce birefringence at low levels of flux, it is expensive and exhibits reduced effectiveness at eliminating thermally induced birefringence at high flux levels (e.g., greater than approximately 500 lumens).

For example, FIG. 1 illustrates a prior art color management system 100, commonly known as the ColorQuad™ from Colorlink, in which four cube polarizing beamsplitters and five color selective retardation components are used to provide color separation and recombination. In accordance with the color management system 100, the input cubic polarizing beamsplitter receives an input light beam 120 and separates it into three components, a green component 121, a blue component 122, and a red component 123. The red component 123 receives spatial information from a red panel 133; the blue component 122 receives spatial information from a blue panel 132; and the green component 121 receives spatial information from a green panel 131. Finally, the output cubic polarizing beamsplitter recombines the red component 123 and the blue component 122 with the green component 121 to form a full color image 140. It should be noted that at high levels of light flux, cubic polarizing beamsplitter 110 becomes thermally loaded and necessarily distorts physically, causing stress birefringence, which results in depolarization of the light and a loss of contrast.

In an attempt to reduce the adverse effects of the use of cube polarizing beamsplitters, various attempts have been made to implement plate polarizing beamsplitters in place of cube configurations in color management systems. However, these attempts have given rise to other optical aberrations associated with the plate polarizing beamsplitters such as astigmatism.

Accordingly, it would be advantageous to have a color management system that could be used in high flux projection systems while simultaneously functioning in a wide range of thermal environments with reduced birefringence sensitivity and improved durability. It would further be advantageous to have a color management system that could achieve these objectives without requiring costly, high index, low birefringence glass or particular susceptibility to optical aberrations produced by polarizing beamsplitters in plate configurations.

SUMMARY OF THE INVENTION

The methods and apparatus of the present invention address many of the shortcomings of the prior art. In accordance with various aspects of the present invention, improved methods and apparatus provide color management for projection display systems. Effective color management of the present invention is suitable for use in high flux projection systems with improved contrast, birefringence sensitivity and durability, while significantly reducing cost. In addition, the instant invention provides color management suitable for use in adverse thermal environments without requiring costly, high index, low birefringence glass.

In accordance with an exemplary embodiment of the present invention, a color management system includes a beamsplitter positioned to receive a light beam, a microdisplay positioned to receive the light beam from the beamsplitter and emit a modified light beam to the beamsplitter, and a plurality of prisms positioned to receive the modified light beam from the beamsplitter and emit a light output that compensates for an optical aberration induced by the beamsplitter.

In accordance with an embodiment of the present invention, an optical system includes a first beamsplitter positioned to receive light from a light source and separate the light into a first light beam and a second light beam and a second beamsplitter having a first portion positioned to receive the first light beam and a second portion positioned to receive the second light beam. The optical system also includes a first microdisplay positioned to receive the first light beam and emit a first modified light beam having first spatial information and a second microdisplay positioned to receive the second light beam and emit a second modified light beam having second spatial information. The optical system also includes a light combiner positioned to receive the first and second modified light beams and emit a light output and a plurality of prisms positioned to receive the light output from the light combiner and emit a compensated light output that compensates for an optical aberration induced by the light combiner.

In accordance with an embodiment of the present invention, an optical system includes a beam director positioned to receive light from a light source and emit a light beam, a microelectromechanical system (MEMS) display positioned to receive the light beam and emit a modified light beam to be received by the beam director, and a plurality of prisms positioned to receive the modified light beam and emit a light output that compensates for an optical aberration induced by the beam director.

The compensating prism group is positioned to receive the first light beam and configured for transmitting the first light beam to be received by a first microdisplay. After the first microdisplay imparts spatial information on the first light beam, producing a modified first light beam, the compensating prism group receives the modified first light beam and emits a compensated light output. This compensated light output comprises the modified first light beam and also compensates for optical aberrations induced by the light separator, and/or any other optical component that may cause an optical aberration, as well as any other optical phenomena that may benefit from compensation. Finally, the color management system of the present invention includes means for forming a comprehensive light output from the compensated light output and a complementary light output comprising the second light beam.

In an exemplary embodiment, the light separator includes a filter positioned to receive a broad-spectrum light input and configured to selectively rotate a component of the light to emit light oriented in two planes. In this embodiment, the light separator further comprises a polarizing beamsplitter positioned to receive the bi-oriented light and to separate it into two light outputs. In one embodiment, these light outputs include a first light beam comprising a first component and a second light beam comprising one or more additional components.

In another exemplary embodiment, the color management system includes an image assimilator positioned to receive from the light separator the second beam and configured to separate it into two output beams, each having a distinct component. The image assimilator then transmits each of the output beams to a corresponding microdisplay and receives a modified beam from each of the microdisplays, the modified beams including superimposed spatial information. Finally, the image assimilator produces an output comprising the modified outputs from the microdisplays.

As used herein, the term "component" refers to a portion of a light transmission. For example, where a light transmission contains light of various wavelengths in the visible spectrum (e.g., blue, red, and green) the light transmission may be separated into a plurality of components, each corresponding to a range of wavelengths (i.e., color bands) each approximating a color band, such as blue, red, or green, in the visible spectrum. As a further example, a light transmission may comprise polarized light oriented in one or more planes.

In accordance with an exemplary embodiment of the invention, the image assimilator may comprise a dichroic prism. Alternatively, the image assimilator may comprise a polarizing filter and a polarizing beamsplitter. In accordance with this embodiment, the polarizing filter produces a differentiated light output comprising second and third components having differing orientations. The second polarizing beamsplitter receives the differentiated light output and separates it into a plurality of outputs, each having a different color component, for transmitting to a plurality of corresponding microdisplays.

In accordance with another exemplary embodiment of the present invention, the compensating prism group may comprise a pair of prism compensators arranged to be separated by an air gap configured to compensate for one or more optical aberrations produced by the polarizing beamsplitter. Optionally, the compensating prism group may also exhibit a tilted orientation or may incorporate a tilted compensator plate.

In accordance with another exemplary embodiment of the present invention, the color management system may also include a filter (e.g., a color selective retarder element) and an analyzer for improving contrast in the projected image. The function of the color selective retarder element is to selectively rotate the appropriate color bands so that the emerging light is substantially linearly polarized and further that the polarization axis for each color band is substantially the same. The filter and analyzer may be positioned to receive light output from both the image assimilator and the compensating prism group. Optionally, depending on the characteristics of the color selective retardation element, the analyzer may remove light of a predetermined wavelength or band of wavelengths from the light output. Finally, the color management system may include a projection lens for projecting an output light beam containing spatial information for projecting an image.

Accordingly, the use of a prism compensator group enables the color management system to effectively employ a polarizing beamsplitter configured as a plate rather than a cube as in the prior art. Moreover, the present invention may employ both polarization dependent elements and dichroic elements to split an input light into a plurality of color bands upon which spatial information may be superimposed by a corresponding plurality of microdisplays, the modified color bands being recombined to produce a full color projected image.

BRIEF DESCRIPTION OF THE DRAWINGS

The above-mentioned objects and features of the present invention can be more clearly understood from the following detailed description considered in conjunction with the following drawings, in which like numerals represent like elements and in which.

DETAILED DESCRIPTION OF THE INVENTION

The present invention may be described herein in terms of various functional elements and/or various processing steps. It should be appreciated that such functional elements may be realized by any number of software, hardware, electrical, optical or structural elements configured to perform the specified functions. For example, the present invention may employ various optical and/or digital electrical elements, whose values may be suitably configured for various intended purposes. In addition, the present invention may be practiced in any optical application. However, for purposes of illustration only, exemplary embodiments of the present invention will be described herein in connection with projection displays. Further, it should be noted that while various elements may be suitably coupled or connected to other elements within exemplary optical systems, such connections and couplings can be realized by direct connection between elements, or by connection through other elements and devices located thereinbetween.

As discussed above, prior art color management systems suffer from shortcomings such as limitation in light intensity, high cost, poor image contrast, excessive birefringence sensitivity, and lack of durability. Prior art attempts to overcome these shortcomings have involved use of costly high-index, low-birefringence glass. Yet, despite the use of these expensive materials, thermally induced birefringence remains a problem at light intensity levels greater than approximately 500 lumens.

In accordance with various aspects of the present invention, an improved color management system is provided that provides color management suitable for use in adverse thermal environments without requiring costly, high index, low birefringence glass. In accordance with an exemplary embodiment of the present invention, input illumination light is split into a plurality of different color bands and then recombined after superimposition of spatial information by a corresponding plurality of microdisplays and compensation for optical aberrations as provided by a compensating prism group, thereby producing a full color image. As a result, effective color management is suitable for use in high lumen projection systems with reduced cost, improved contrast, reduced birefringence sensitivity, and improved durability. In addition, the present invention provides color management suitable for use in adverse thermal environments without requiring costly, high index, low birefringence glass.

Figure 1:
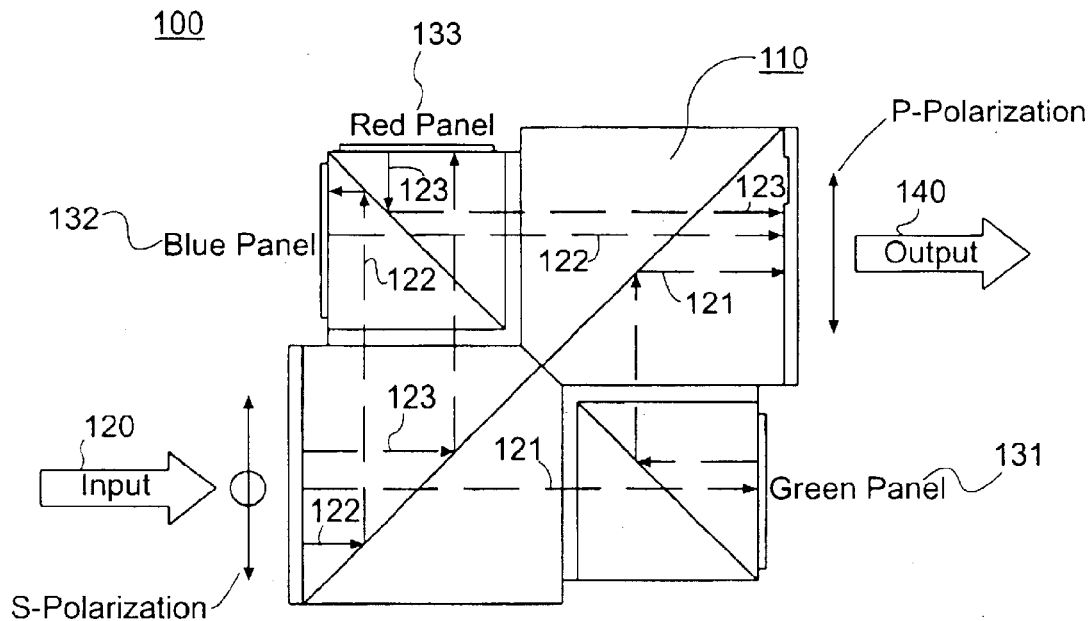
FIG. 1 illustrates a prior art color management system.
Figure 2A:
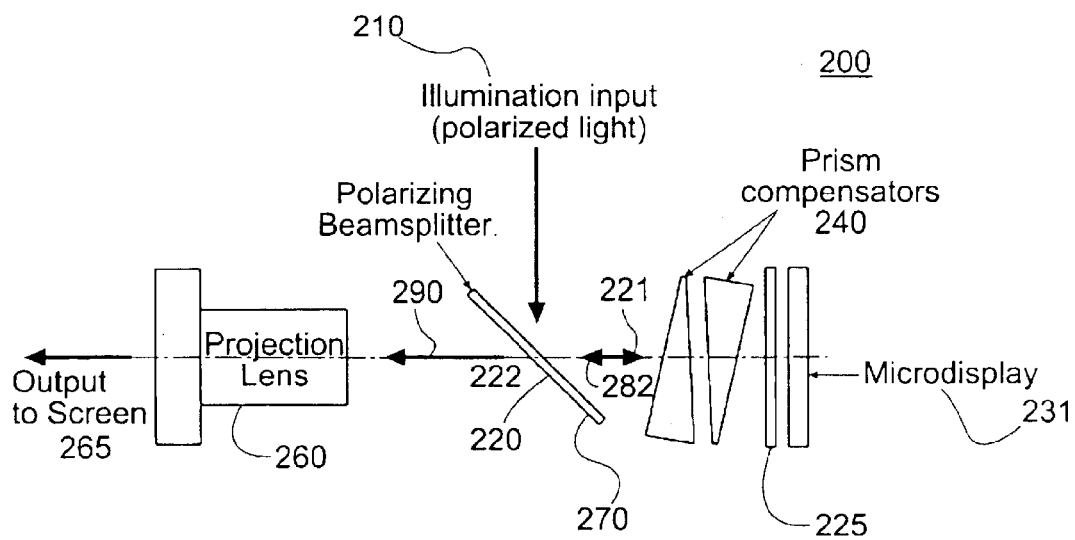
FIG. 2A illustrates a single panel color management system in accordance with an exemplary embodiment of the present invention.

In one embodiment, with reference to FIG. 2A, an exemplary color management system 200 includes a light separator 220, a compensating prism group 240, and means 270 for forming a comprehensive light output 290. In accordance with an exemplary embodiment, the light separator 220 is positioned to receive a light input 210 comprising a first component and a second component. The light separator 220 is configured for separating the first component from the second component and emitting a first light beam 221 comprising the first component and a second light beam 222 comprising the second component. It should be noted that the light separator 220 may comprise a polarizing beamsplitter configured for separating light oriented in a first plane from light oriented in a second plane and emitting a first light beam comprising light oriented in the first plane and a second light beam comprising light oriented in the second plane.

In accordance with an exemplary embodiment, the compensating prism group 240 is positioned to receive first light beam 221, and the compensating prism group 240 is configured for transmitting the first light beam 221 to be received by a first microdisplay 231. In one embodiment, a filter 225 (e.g., an optical retarder element with retardation values from about 3 nanometers (nm) to about 500 nm) is positioned physically and optically between the compensating prism group 240 and the first microdisplay 231. The filter 225 may be separated from, in contact with or part of the first microdisplay 231. For example, the filter 225 may be a coating over the first microdisplay 231. The filter 225 is positioned to receive the first light beam 221 from the compensating prism group 240 and is configured to substantially compensate or correct for the optical or residual retardence of the light separator 220 and/or the compensating prism group 240 and/or the microdisplay 231. The residual retardence may be from any passive optical component such as from the light separator 220, the first microdisplay 231, dichroic coatings, lenses, wire grid polarizers, etc. In one embodiment, the filter 225 is configured to receive a modified first light beam from the first microdisplay 231, compensate for optical aberrations or retardence caused by the first microdisplay 231 and transmit the modified first light beam to the compensating prism group 240, which emits a compensated light output 282. In another embodiment, the compensating prism group 240 is configured to receive a modified first light beam from the first microdisplay 231 and emitting a compensated light output 282. In accordance with an exemplary embodiment of the present invention, the compensated light output 282 comprises the modified first light beam and compensates for an optical aberration induced by the light separator 220.

Figure 4:
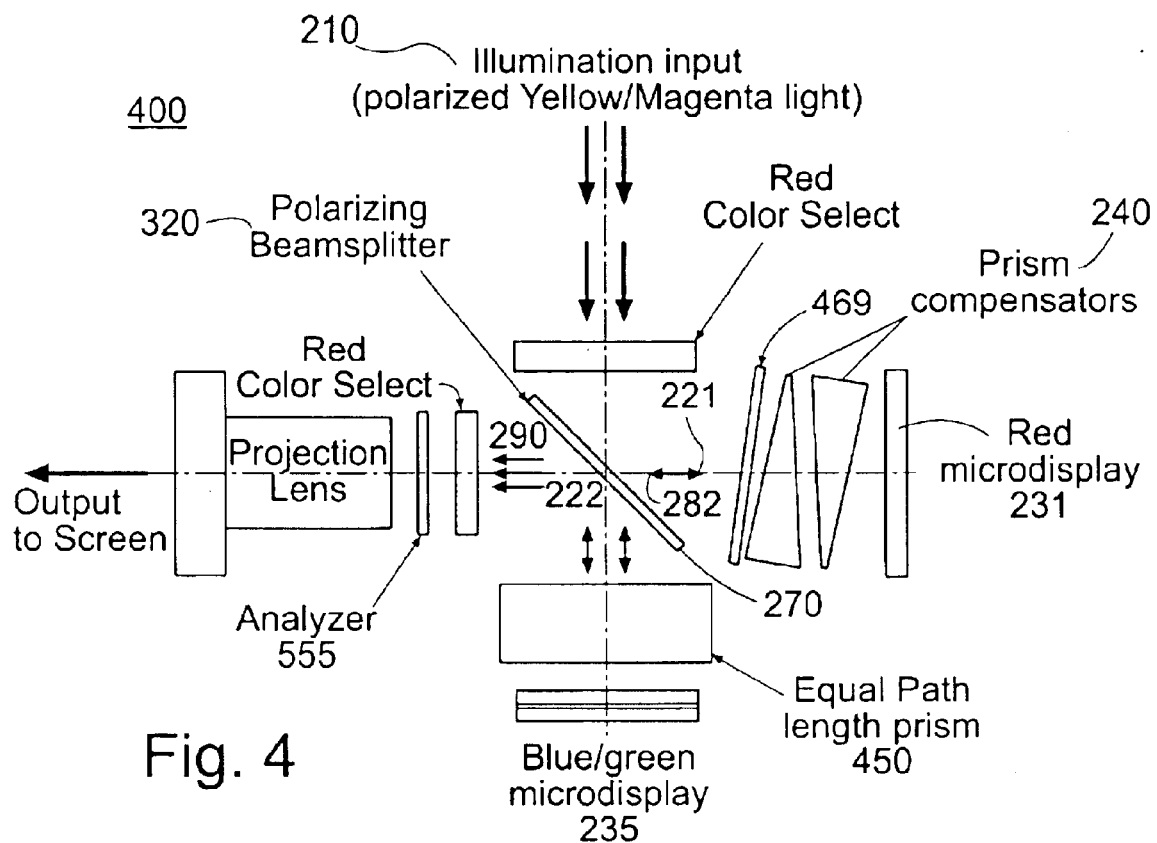
FIG. 4 illustrates a dual panel color management system in accordance with another exemplary embodiment of the present invention, wherein the compensating prism group is tilted and the image assimilator is a substantially equal path length prism.

In accordance with an exemplary embodiment, the compensating prism group 240 comprises a pair of prism compensators where each prism is substantially identical in shape and optical properties. These prism compensators 240 may be arranged to be separated by an air gap. The size of the air gap depends upon the thickness and orientation of the light separator 220, typically being between about 1 and 4 millimeters, and in an exemplary embodiment, being substantially 2.5 millimeters. Further, the air gap may be configured for compensating for one or more optical aberrations. In accordance with another exemplary embodiment of the present invention, as shown in FIG. 4, the compensating prism group 240 may exhibit a tilted orientation. For example, the compensating prism group 240 may be oriented at an angle of between about −30 degrees and about +30 degrees. In an exemplary embodiment, the compensating prism group 240 may be oriented at an angle of approximately 15 degrees. Further still, the compensating prism group 240 may comprise a tilted compensator plate 469 that exhibits a tilted orientation. For example, the tilted compensator plate 469 may be oriented at an angle of between about −30 degrees and about +30 degrees. In an exemplary embodiment, the tilted compensator plate 469 may be oriented at an angle of approximately 15 degrees. Finally, the compensating prism group 240 may be configured to exhibit an equivalent optical path length substantially equal to that of the polarizing beamsplitter.

In an exemplary embodiment, the invention also includes means 270 for forming a comprehensive light output 290 from the compensated light output 282 and a complementary light output 222 comprising the second light beam 222. In an exemplary embodiment, the means 270 for forming the comprehensive light output 290 comprise a polarizing beamsplitter 270, which maybe the same element, and serve the same function, as the light separator 220.

As used herein, the term "filter" refers to an optical filter configured to discriminate (i.e., block or permit to pass or alter the polarization properties of light flux based on physical characteristics of the light, such as wavelength, orientation, polarization, or flash or field rate) and may be constructed using any technique known in the art such as, for example, embedding an optically active material such as a spectrally sensitive optical retardation film in or on an otherwise transparent substrate or placing a plurality of very thin wires in parallel orientation to one another leaving thin gaps through which light may pass to produce polarized light. Examples of filters configured for discriminating light based upon its physical characteristics include dichroic plates manufactured by OCLI of Santa Rosa, Calif. and Unaxis of Liechtenstein, ColorSelect filters manufactured by ColorLink of Boulder, Colo. and ProFlux polarizers and polarizing beamsplitters manufactured by Moxtek, Inc. of Orem, Utah.

Figure 2B:
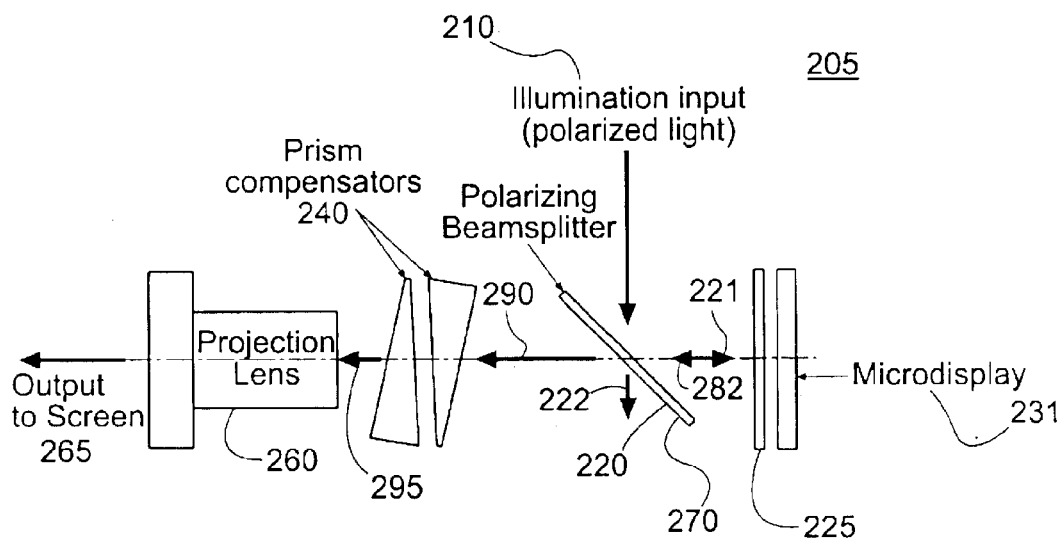
FIG. 2B illustrates a single panel color management system in accordance with an exemplary embodiment of the present invention.

With reference to FIG. 2B, an exemplary color management system 205 includes a light separator 220, a microdisplay 231, a compensating prism group 240, and means 270 for forming a comprehensive light output 290. The light separator 220 is positioned to receive a light input 210 that may include a first component and a second component. The light separator 220 may be configured for separating the first component from the second component and emitting a first light beam 221 including the first component and a second light beam 222 including the second component. The light separator 220 may be a polarizing beamsplitter configured to separate the light oriented in a first plane from the light oriented in a second plane and to emit a first light beam 221 including the light oriented in the first plane and a second light beam 222 including the light oriented in the second plane. In one embodiment, the light separator 220 is positioned to receive the light input 210 and emit a first light beam 221 including the first and second components toward the microdisplay 231. In one embodiment, the filter 225 is positioned to receive the first light beam 221 from the light separator 220 and is configured to substantially compensate for the optical retardence of the light separator 220.

The microdisplay 231 is positioned to receive the first light beam 221 and configured to transmit a modified first light beam 282 to the filter 225, which compensates for an optical aberration induced by the light separator 220 and/or the microdisplay 231. The filter 225 transmits the modified first light beam 282 to the light separator 220. The light separator 220 may be a dichroic thin film stack, a dichroic mirror or a polarizing beamsplitter that is used to filter the modified first light beam 282 and emit a comprehensive light output 290. The compensating prism group 240 is positioned to receive the comprehensive light output 290 and is configured to transmit a compensated light output 295 to be received by a projection lens 260.

Figure 7:
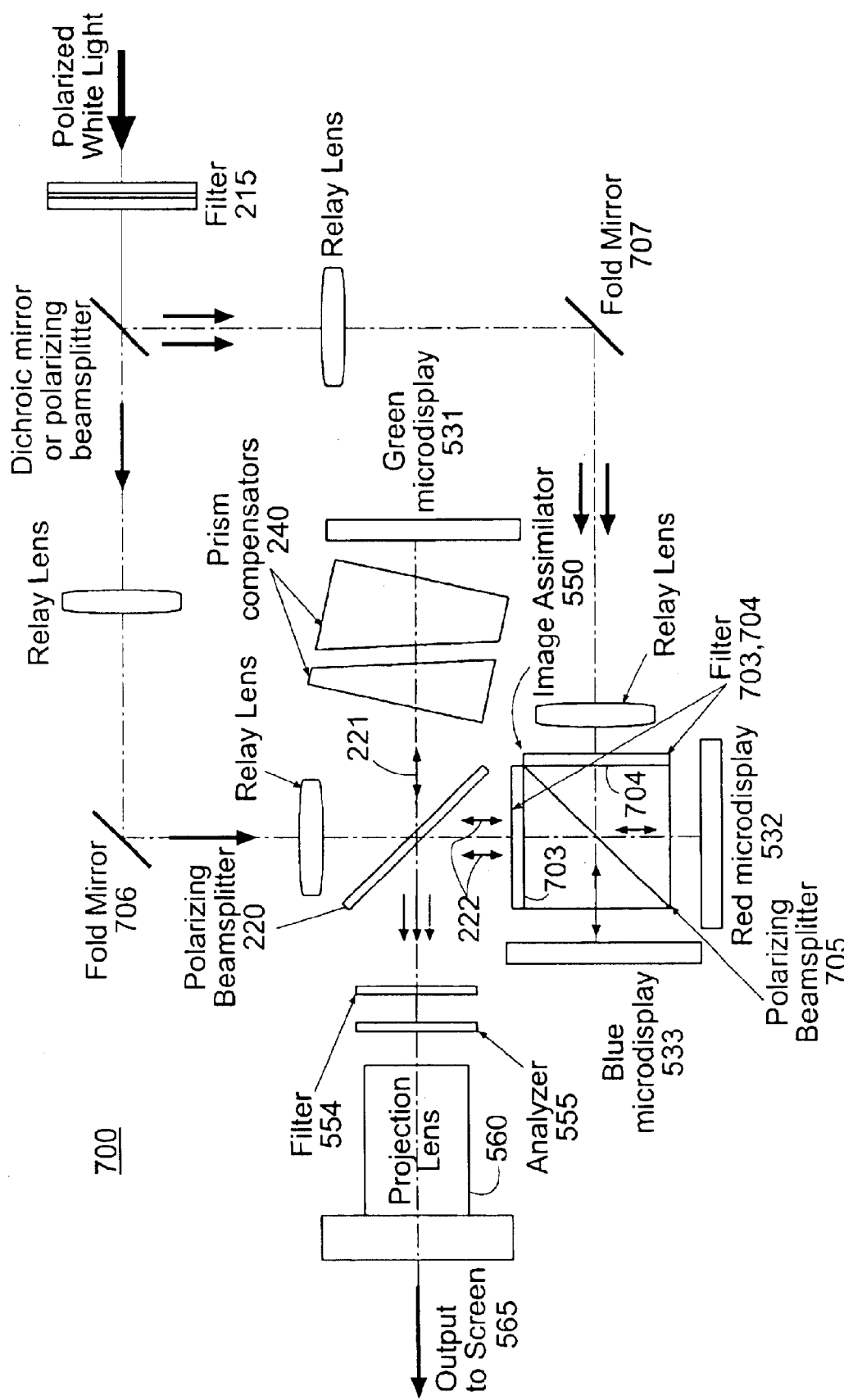
FIG. 7 illustrates a three-panel color management system in accordance with yet another exemplary embodiment of the present invention, wherein the light separator may be either a dichroic mirror or a polarizing beamsplitter, and wherein the first light beam is received by the compensating prism group after being reflected by a polarizing beamsplitter, wherein the second light beam does not encounter the polarizing beamsplitter before being received by the image assimilator, and wherein the image assimilator comprises a filter for selectively rotating a component as well as a polarizing beamsplitter.
Figure 9:
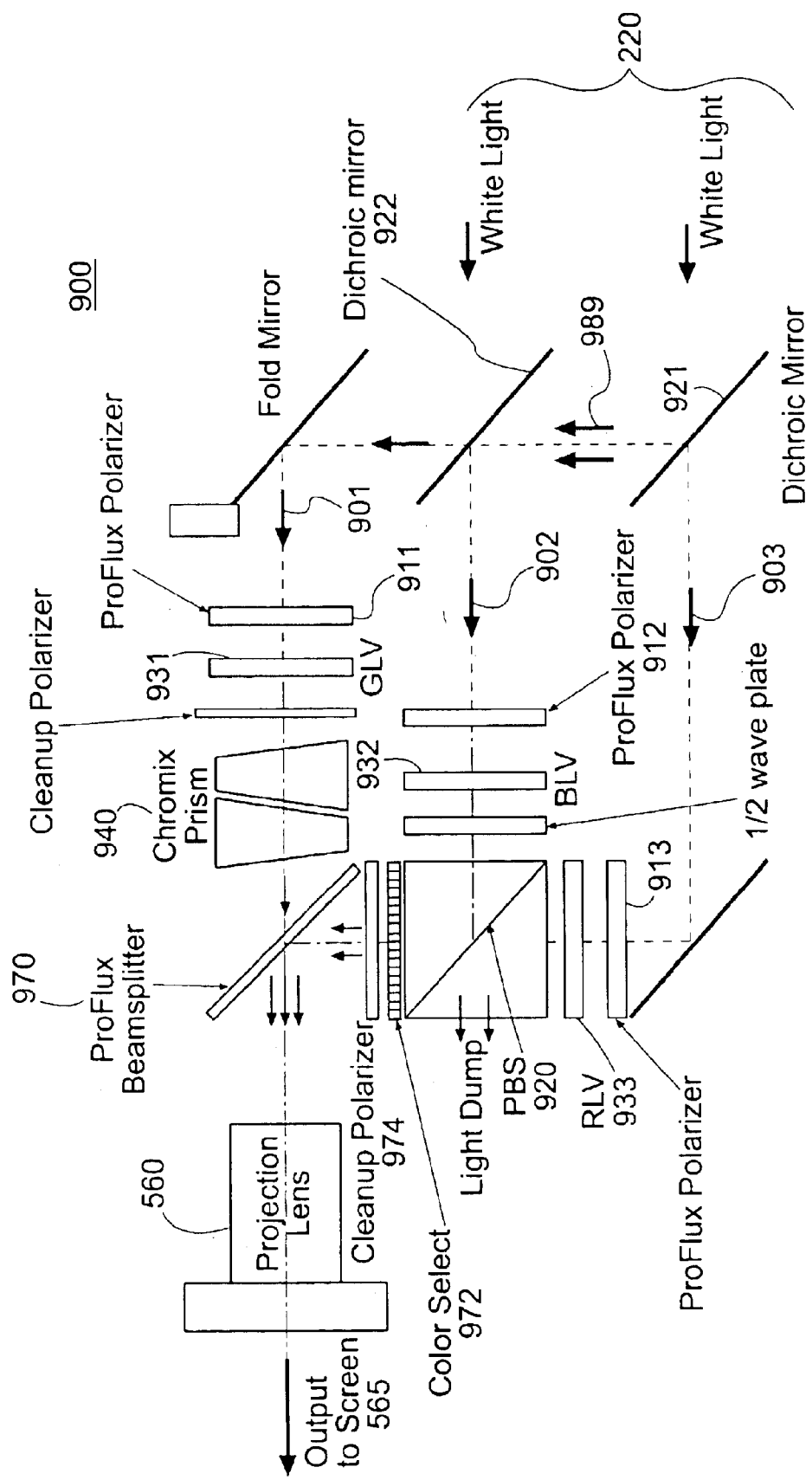
FIG. 9 illustrates a three-panel pass through color management system in accordance with yet another exemplary embodiment of the present invention, wherein the light separator comprises a plurality of dichroic mirrors, and wherein spatial information is imparted on each of the three light beams by a red transmissive light valve, a green transmissive light valve, and a blue transmissive light valve prior to recombination through two polarizing beamsplitters. Appropriate transmissive light valves may be chosen from a variety of different available sizes and resolutions to suit the needs of the particular application and are readily commercially available as manufactured by both the Sony and Epson corporations.

As shown in FIG. 7, the light separator 220 may be a dichroic mirror or a polarizing beamsplitter. In addition, as illustrated in FIG. 7, the first light beam 221 may be received by the microdisplay 531 after being reflected by the polarizing beamsplitter 220, wherein the second light beam 222 may pass through the polarizing beamsplitter 220 before being received by the image assimilator 550, and wherein the image assimilator 550 includes a filter 704 for selectively rotating a component and a polarizing beamsplitter 705. Alternatively, as shown in FIG. 9, the light separator 220 may comprise a plurality of dichroic mirrors/beamsplitters 921, 922.

Figure 6:
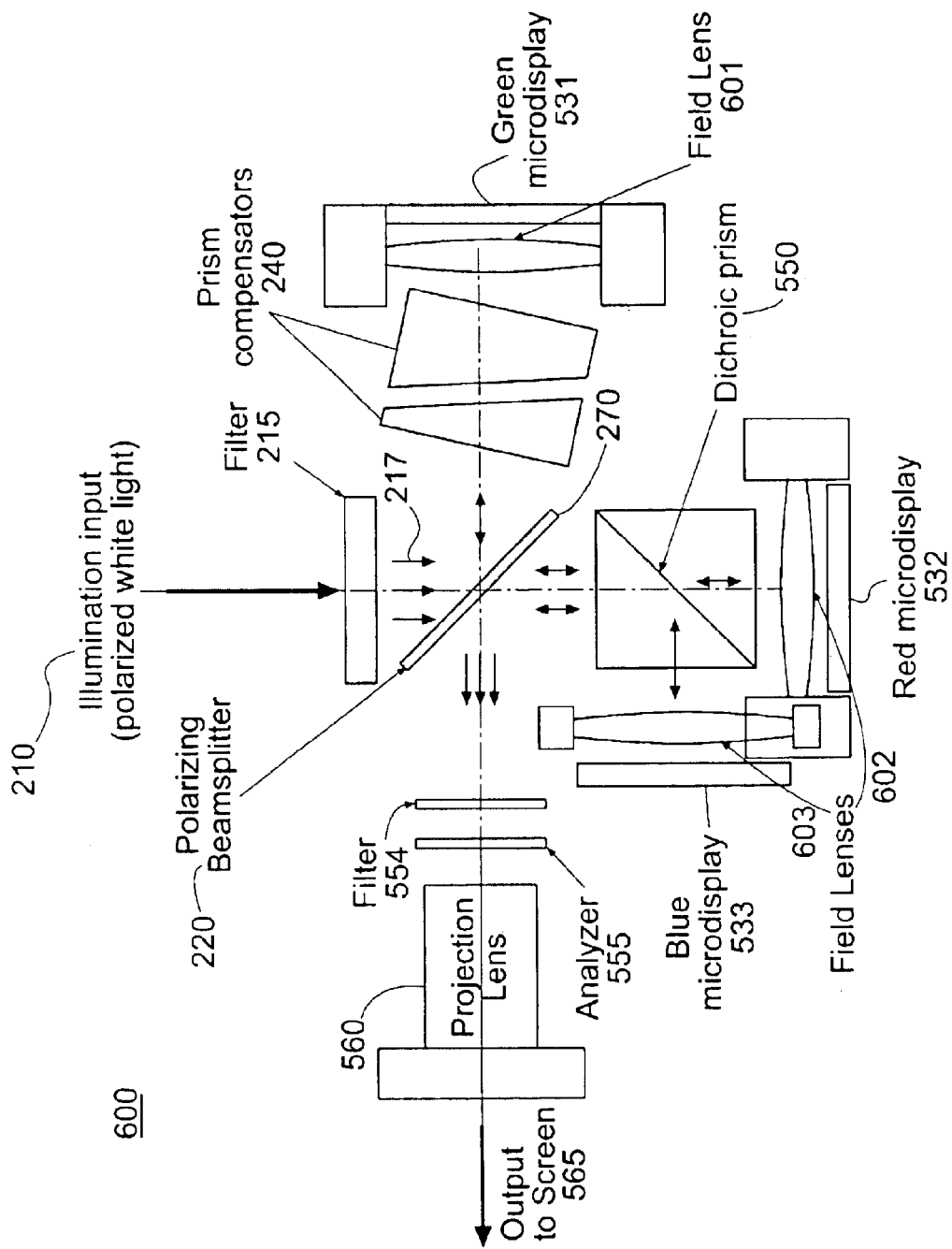
FIG. 6 illustrates a three panel color management system incorporating a plurality of field lenses positioned to receive and focus the component light beams so as to reduce the diameter of the light beams.

As shown in FIG. 6, a filter 215 is configured to receive a linear polarized white light input 210 and to selectively rotate the polarization component of the white light input 210 to produce a light output 217 including polarized light oriented in a first plane and polarized light oriented in a second plane. In accordance with one embodiment, the polarized light oriented in the first plane includes a first color component, such as green light and the polarized light oriented in the second plane includes a second color component, such as red light, and a third color component, such as blue light.

The polarizing beamsplitter 220 is positioned to receive the first polarized light output 217 from the filter 215. The polarizing beamsplitter 220 is configured to separate an incipient beam of light into two emergent linear polarized beams of light. As such, the polarizing beamsplitter 220 may include a dichroic mirror having a coating configured to separate light into components of different colors. For example, a typical coating may be a thin film dichroic or dielectric coating. Alternatively, the polarizing beamsplitter 220 may be a dielectric beamsplitter having a coating configured to separate light into different components base upon color or polarization.

Figure 3:
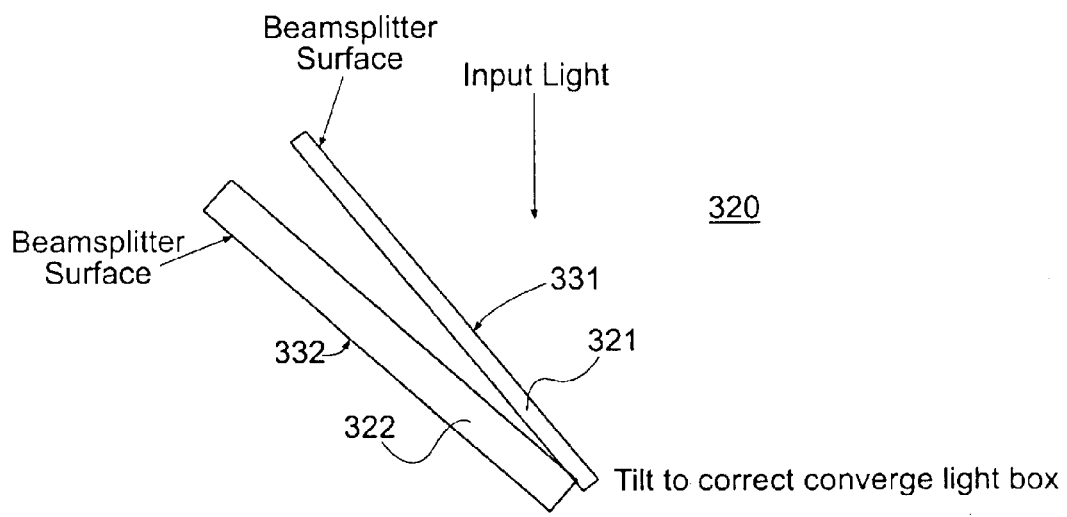
FIG. 3 illustrates a polarizing beamsplitter in accordance with an exemplary embodiment, wherein the polarizing beamsplitter comprises a pair of tilted polarizing beamsplitters having their active surfaces facing substantially away from one another.

As shown in FIG. 3, the polarizing beamsplitter 320 may include two or more polarizing beamsplitters 321, 322 having their active surfaces facing substantially away from one another so as to further improve contrast and minimize stress birefringence such as that caused by uneven thermal loading. The plurality of polarizing beamsplitters 321, 322 optionally may be tilted with respect to one another to compensate for any offset between the associated light beams, such as that which may be caused by the finite and/or differing thickness of each of the polarizing beamsplitters. It should be noted that such a plurality of polarizing beamsplitters 321, 322 tilted with respect to one another may be useful in a variety of applications wherever it is desired to separate and recombine light with corresponding need to correct aberrations in the incipient or the emitted light. In an exemplary embodiment, the polarizing beamsplitter 320 may comprise a single component having active polarizing beamsplitter surfaces on both sides. An example of such a polarizing beamsplitter 320 would be an optically transmissive subtrate with Proflux™ polarizing beamsplitter surfaces on both surfaces.

In accordance with the invention, the polarizing beamsplitter 320 is configured to separate the polarized light oriented in the first plane from the polarized light oriented in the second plane. In an exemplary embodiment, the polarizing beamsplitter 320 may be configured to emit in a first direction the polarized light oriented in the first plane and to emit in a second direction the polarized light oriented in the second plane, wherein the second direction is substantially orthogonal to the first direction. In another exemplary embodiment, the polarizing beamsplitter 320 may be configured to transmit the polarized light oriented in the second plane toward an equal path length prism 450 and to reflect the polarized light oriented in the first plane toward the microdisplay 231.

Alternatively, as shown in FIG. 7, the polarizing beamsplitter 220 may be configured to reflect the polarized light 221 oriented in the second plane toward the compensating prism group 240 and to be received by a first microdisplay 531 and to transmit the polarized light 222 oriented in the first plane toward the image assimilator 550. In accordance with this embodiment, a plurality of fold mirrors 706, 707 maybe employed to direct the various light beams between the elements of the color management system 700. As used herein, a fold mirror refers to any reflective surface capable of reflecting light. For example, the fold mirror 706 may be an aluminized mirror or an enhanced silver mirror as produced by Unaxis company of Liechtenstein. As shown in FIG. 3, the polarizing beamsplitter 320 may comprises a pair of polarizing beamsplitters 321, 322 having their active surfaces 331, 332 facing substantially away from one another, or a single polarizing beamsplitter component with active surfaces on both sides.

With reference to FIG. 6, the image assimilator 550 (e.g., a dichroic prism) may be positioned to receive from the polarizing beamsplitter 220 polarized light oriented in the second plane. The image assimilator 550 may be configured for separating the second component from the third component and transmitting the second component to be received by a second microdisplay 532 and the third component to be received by a third microdisplay 533. In addition, the image assimilator 550 may be further configured to receive a modified second component from the second microdisplay 532 and to receive a modified third component from the third microdisplay 533. Finally, the image assimilator 550 maybe configured to emit an assimilated light output to be received by the polarizing beamsplitter 270, the assimilated light output including the modified second component and the modified third component. In an exemplary embodiment, the equivalent optical path length associated with the glass or other optical material of the image assimilator 550 may be determined so that compensating characteristics may be incorporated into appropriate system elements such as the compensating prism group 240. The polarizing beamsplitter 220 reflects the polarized light oriented in the first plane toward and to be received by the compensating prism group 240.

In one embodiment, as shown in FIG. 4, the image assimilator 450 may be a substantially equal path length prism 450. The image assimilator 450 may include a polarizing filter for producing a differentiated light output including the second component and the third component. The differentiated light output is received by a microdisplay 235, which transmits a modified light output to the image assimilator 450. As shown in FIG. 4, the microdisplay 235 can be a multi-level microdisplay that includes a front microdisplay positioned parallel and adjacent to a rear microdisplay. The front microdisplay is configured to receive the second component and the rear microdisplay is configured to receive the third component. The multi-level microdisplay transmits a modified light output to the image assimilator 450.

Figure 5:
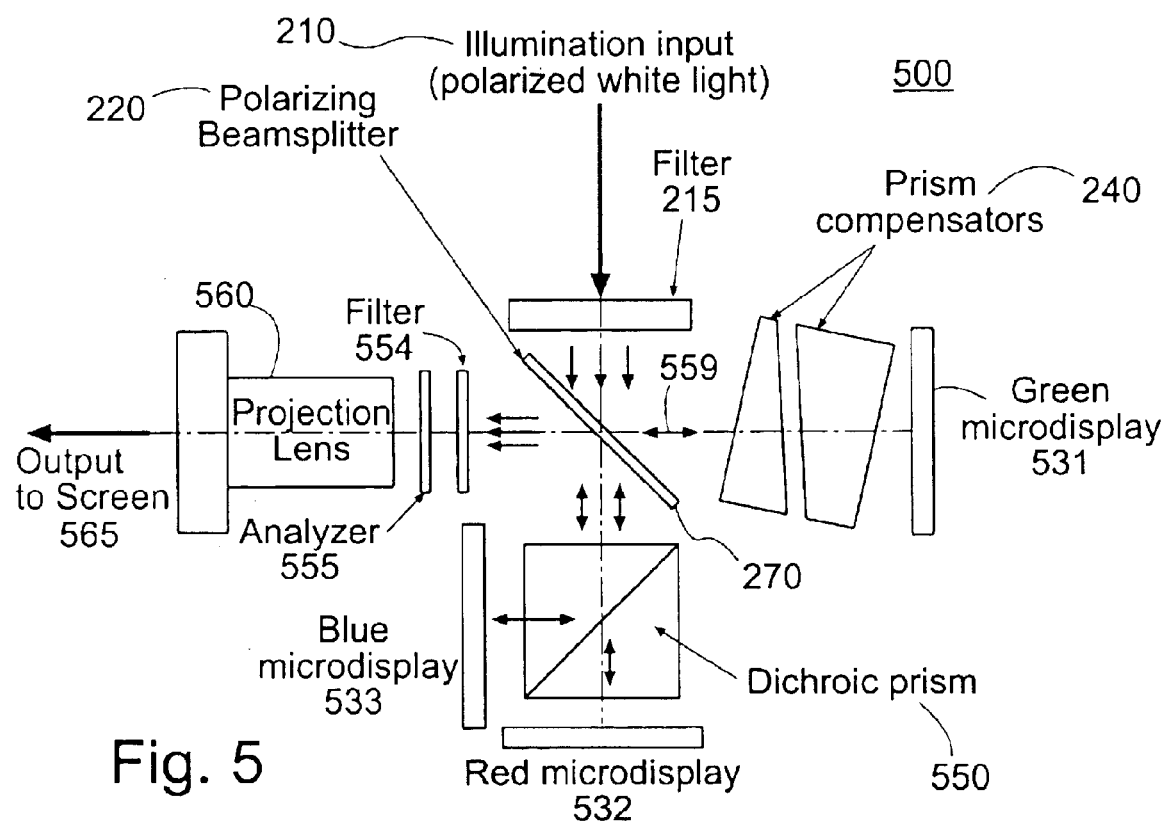
FIG. 5 illustrates a three-panel color management system in accordance with yet another exemplary embodiment of the present invention, wherein the image assimilator is a dichroic prism and the output is further enhanced by an output filter and an analyzer.

In an exemplary embodiment, as shown in FIGS. 5 and 6, the image assimilator 550 includes a dichroic prism. In another exemplary embodiment, the image assimilator 550 may include a polarizing filter for producing a differentiated light output including the second component and the third component, where the orientation of the second component is rotated to be orthogonal to the orientation of the third component. In accordance with this alternative embodiment, the image assimilator 550 further includes a second polarizing beamsplitter positioned to receive from the polarizing filter the differentiated light output. The second polarizing beamsplitter is configured for separating the second component from the third component before transmitting the second component to be received by a second microdisplay 532 and before transmitting the third component to be received by a third microdisplay 533.

The compensating prism group 240 is positioned to receive the polarized light from the polarizing beamsplitter 220. The compensating prism group 240 may include a pair of prism compensators and is configured to transmit a compensated light output to a filter 554. In accordance with an exemplary embodiment, the compensating prism group 240 is configured to exhibit an equivalent optical path length substantially equal to that of the image assimilator 550. In an exemplary embodiment, the prism compensators of the compensating prism group 240 are arranged to be separated by an air gap configured to compensate for one or more optical aberrations produced by the polarizing beamsplitter 220 and/or the microdisplay 531.

In another exemplary embodiment, as shown in FIG. 2B, the compensating prism group 240 may exhibit a tilted orientation such that its surface facing the polarizing beamsplitter 270 is tilted with respect to a plane that lies orthogonally to the most direct path from the polarizing beamsplitter 270 to the compensating prism group 240. In another exemplary embodiment, as shown in FIG. 4, the compensating prism group 240 may further include a tilted compensator plate 469 exhibiting a tilted orientation such that its surface facing the polarizing beamsplitter 270 is tilted with respect to a plane that lies orthogonally to the most direct path from the polarizing beamsplitter 270 to the tilted compensator plate 469.

In an exemplary embodiment, as shown in FIG. 5, the output light may be further enhanced by the filter 554 and/or an analyzer 555 positioned to receive the compensated light output from the compensating prism group 240 and to further modify the compensated light output to produce a polarized light beam oriented in a single plane, i.e., substantially linearly polarized light, which may be accomplished by rotating the polarization axis of one or more of the light beams. In accordance with this exemplary embodiment, the color management system 500 may include the analyzer 555 positioned to receive the polarized light beam emitted from the filter 554 so as to produce a sharpened comprehensive light output having an improved contrast relative to the polarized light beam emitted from the filter 554. In yet another exemplary embodiment, the analyzer 555 may be configured for removing light of a predetermined wavelength from the compensated light output and/or the polarized light beam, depending on the characteristics of the filter 554 (i.e., the color selective retardation elements). Finally, it should be noted that the light beam emitted from the color management system 500 may be magnified through a projection lens 560 for projection of an image onto a screen 565.

Figure 8:
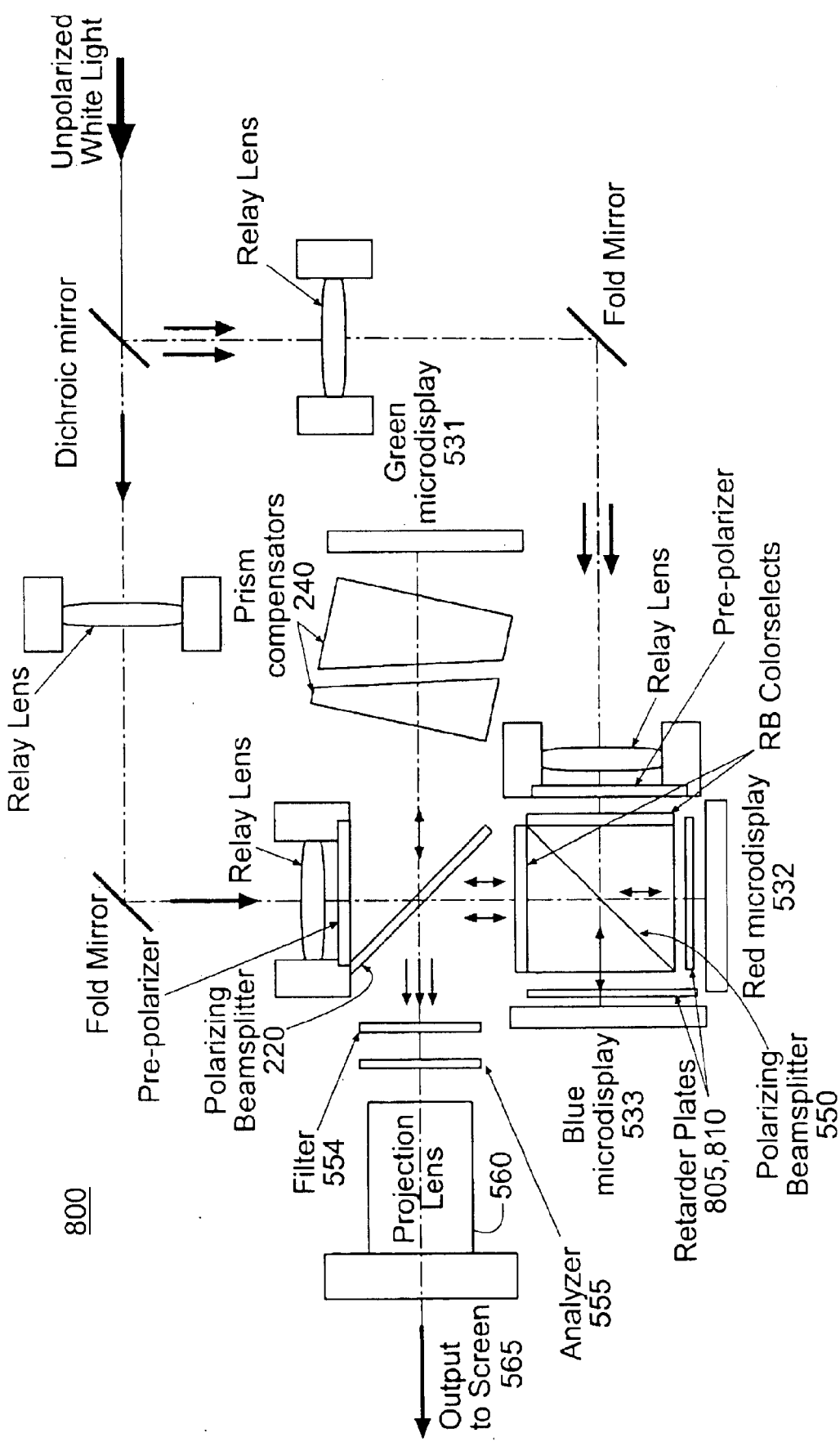
FIG. 8 illustrates a three-panel color management system in accordance with yet another exemplary embodiment of the present invention, wherein the light separator is a dichroic mirror, and wherein retarder plates are positioned to receive and improve light beams prior to their receipt by the blue and red microdisplays.

As illustrated in FIG. 6, a color management system 600 may improve its ability to handle increased light flux requirements while maintaining or decreasing physical size by incorporating a plurality of field lenses 601, 602, 603 positioned to receive and focus the component light beams so as to reduce the diameter of those light beams. Still further, as shown in FIG. 8, the color management system 800 may include one or more retarder plates 805, 810 positioned to receive and improve light beams prior to their receipt by the blue microdisplay 533 and/or the red microdisplay 532.

In an exemplary embodiment, as shown in FIG. 6, the color management system 600 may include one or more field lens 601, 602, 603, each lens 601, 602, 603 positioned to receive a linearly polarized beam of light and to focus it prior to receipt of a light beam by a microdisplay and/or after transmission by a microdisplay. In accordance with this embodiment, the light beam may be focused into a more compact output beam, enabling effective use of smaller projection lenses while maintaining equivalent or even increased levels of light flux.

In accordance with this embodiment, the filter 215 receives a substantially linearly polarized light input 210 and selectively rotates a component of the polarized light input to emit light 217 oriented in two planes. The polarizing beamsplitter 220 receives the bi-oriented light 217 and separates it into two substantially linearly polarized light outputs, one having a single component and the other having multiple (e.g., two or more) components. The image assimilator 550 receives from the polarizing beamsplitter 220 the output light having two components and further separates the light into two light outputs, each having one of the two components. The image assimilator 550 then transmits each of the light outputs to corresponding microdisplays 532, 533 and receives a modified output from each of the microdisplays 532, 533. Finally, the image assimilator 550 produces an output including the modified outputs from the microdisplays 532, 533. The compensating prism group 240 and the microdisplay 531 receives the single component light output from the polarizing beamsplitter 220. Then, the polarizing beamsplitter 220 receives a modified light output 559 from the microdisplay 531 and transmits it to be combined with the light output from the image assimilator 550. The combined light is received by the filter 554.

It should be noted that the color management system 200 of the instant invention may be adapted for use in a one panel system as depicted in FIG. 2A, in a dual panel system as illustrated in FIG. 4, or in a three panel system, as illustrated in FIGS. 5–9, by appropriate replacement of the image assimilator 550 with compensating prism group 240.

Further still, as shown by FIG. 9, the system of the present invention may be implemented as a pass through system 900, wherein spatial information may be imparted on each of the three light beams 901, 902, 903 by a green transmissive light valve 931, a blue transmissive light valve 932, and a red transmissive light valve 933, prior to recombination through two polarizing beamsplitters 920, 970. In accordance with this embodiment, an exemplary color management system 900 includes a light separator 220 comprising a first dichroic mirror/beam splitter 921 and a second dichroic mirror 922, wherein the first dichroic mirror/beam splitter 921 is positioned to receive the light input and is configured for separating the first component from the second component and emitting a first light beam 903 comprising the first component and a second light beam 989 comprising the second component, wherein the second dichroic mirror 922 is positioned to receive the second light beam 989 and is configured for separating the second component from the third component and emitting a refined second light beam 902 comprising the second component and a third light beam 901 comprising the third component, wherein the first light beam 903 is to be received by a first polarizer 913 configured for producing a first polarized light beam, the refined second light beam 902 is to be received by a second polarizer 912 configured for producing a second polarized light beam, and the third light beam 901 is to be received by a third polarizer 911 configured for producing a third polarized light beam, the color management system 900 further comprising a red light valve 933 positioned to receive the first polarized light beam and configured for emitting a polarized red light beam to be received by the image assimilator 920, the color management system 900 further comprising a blue light valve 932 positioned to receive the second polarized light beam and configured for emitting a polarized blue light beam to be received by the image assimilator 920, the color management system 900 further comprising a green light valve 931 positioned to receive the third polarized light beam and configured for emitting a polarized green light beam to be received by the cleanup polarizer 975, the compensating prism group 940, and the polarizing beamsplitter 970. Finally, the polarized green light beam is combined, by the polarizing beamsplitter 970, with an assimilated output produced by the polarizing beamsplitter 920, which comprises the polarized blue light beam and the polarized red light beam. In an exemplary embodiment, the output from beamsplitter 920, which comprises the polarized blue light beam and the polarized red light beam, passes through a color select filter 972 and a cleanup polarizer 974 before being combined with the output of beamsplitter 970, which outputs a light output to a projection lens 560 that projects an image onto a screen 565.

Accordingly, the present invention utilizes both polarization dependent elements and dichroic elements to split an input light into a plurality of color bands upon which spatial information may be superimposed by a corresponding plurality of microdisplays, the modified color bands being recombined to produce a full color projected image. The compensating prism group may comprise a pair of prism compensators arranged to be separated by an air gap configured to compensate for one or more optical aberrations produced by the polarizing beamsplitter.

Figure 10:
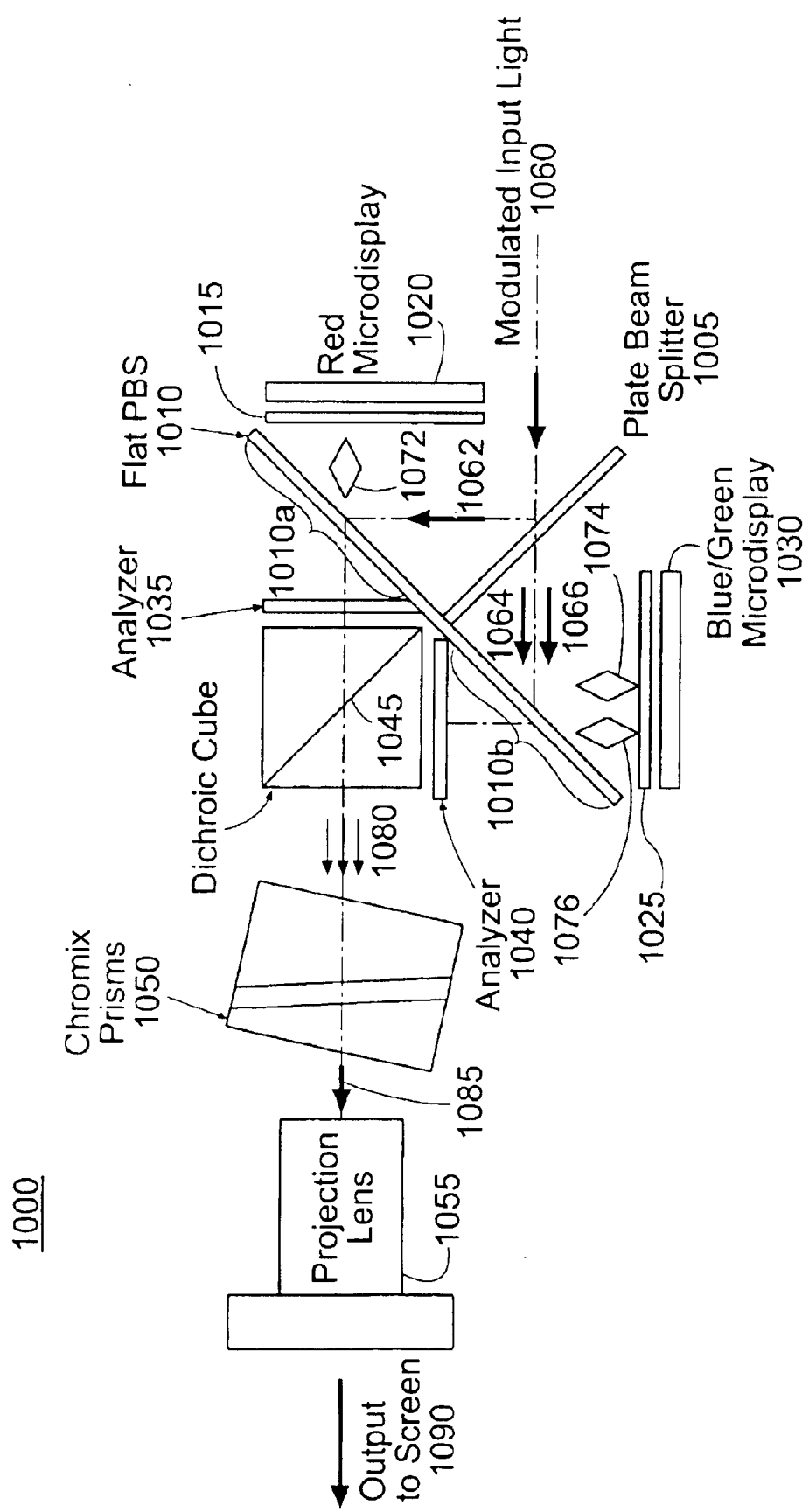
FIG. 10 illustrates a dual panel color management system including a compensating prism group positioned to receive the filtered light output from the light combiner and to compensates for any optical aberrations induced by the light combiner in accordance with another exemplary embodiment of the present invention.

With reference to FIG. 10, an exemplary dual panel color management system 1000 includes a plate beamsplitter 1005, a polarizing beamsplitter 1010, a first retarder 1015, a first microdisplay 1020, a second retarder 1025, a second microdisplay 1030, a first analyzer 1035, a second analyzer 1040, a light combiner 1045, a compensating prism group 1050 and a projection lens 1055. The dual panel color management system 1000 provides the compensating prism group 1050 that is positioned to receive a filtered light output from the light combiner 1045 and to compensates for any optical aberrations induced by the light combiner 1045.

In accordance with this embodiment, the plate beamsplitter 1005 receives a modulated light beam 1060 from a light source, separates the modulated light beam 1060 into two or more components and emits the two or more light beams 1062, 1064, 1066, each comprising one or more of the components. For example, the plate beamsplitter 1005 is positioned to receive the modulated light beam 1060 comprising a first component, a second component and a third component. The plate beamsplitter 1005 is configured to separate the first component from the second and third components and emit a first light beam 1062 comprising the first component, a second light beam 1064 comprising the second component and a third light beam 1066 comprising the third component. In one embodiment, the plate beamsplitter 1005 is a polarizing beamsplitter configured to separate light oriented in a first plane from light oriented in a second plane and emitting a first light beam 1062 comprising light oriented in the first plane and a second light beam 1064 comprising light oriented in the second plane. It should be noted that the plate beamsplitter 1005 may comprise a dichroic mirror, a dichroic prism coupled with an optical retarder, a plate dichroic beamsplitter, or a polarizing beamsplitter, which may further comprise a wire grid polarizer. The plate beamsplitter 1005 may be configured for producing a red light output, a green light output, a blue light output and/or a cyan light output comprising green light and blue light. In one embodiment, the first light beam 1062 comprises a red component and the second light beam 1064 comprises a blue component and the third light beam 1066 comprises a green component.

In one embodiment, the plate beamsplitter 1005 is configured to separate the light beam 1060 oriented in a first plane from the light beam 1060 oriented in a second plane. In an exemplary embodiment, the plate beamsplitter 1005 maybe configured to emit in a first direction the light beam 1060 oriented in a first plane and to emit in a second direction the light beam 1060 oriented in a second plane, wherein the second direction is substantially orthogonal to the first direction. In another exemplary embodiment, the plate beamsplitter 1005 may be configured to substantially reflect the first light beam 1062 oriented in the first plane and to substantially transmit the second light beam 1064 oriented in the second plane.

The polarizing beamsplitter 1010 includes a first portion 1010*a* positioned to receive the first light beam 1062 and a second portion 1010*b* positioned to receive the second light beam 1064. The polarizing beamsplitter 1010 may include a reflective spatial light modulator configured to modify the polarization of the first and second light beams 1062, 1064 in a predetermined manner and to superimpose spatial information on the light beams so as to produce light beams that include spatial information. The polarizing beamsplitter 1010 is configured to reflect the first light beam 1062 toward the first microdisplay 1020 and the second light beam 1064 toward the second microdisplay 1030. The polarizing beamsplitter 1010 may be any flat polarizing beamsplitter such as a wire grid polarization beamsplitter manufactured by Moxtek, Inc., a dichroic beamsplitter, or a cartesian beamsplitter (e.g. Vikuiti™ beamsplitter manufactured by Minnesota Mining & Manufacturing Co.). In one embodiment, the first light beam 1062 is received by the first retarder 1015 and the second light beam 1064 is received by the second retarder 1025. The first and second retarders 1015, 1025 are used to correct for aberrations caused by the microdisplays 1020, 1030. In one embodiment, the first retarder 1015 may be configured to selectively modify the polarization of the light beam emerging from the microdisplay 1020 so that the emerging light is substantially linearly polarized and further so that the polarization axis for each color band is substantially the same as that of each other color band. The first and second retarders 1015, 1025 may have retardation values of approximately 3 nm to 500 nm. The first microdisplay 1020 receives the first light beam 1062 from the first portion 1010*a* of the polarizing beamsplitter 1010 or the first retarder 1015 and the second microdisplay 1030 receives the second light beam 1064 and/or the third light beam 1066 from the second portion 1010*b* of the polarizing beamsplitter 1010 or the second retarder 1025.

In accordance with this exemplary embodiment, the first microdisplay 1020 receives the first light beam 1062, rotates its polarization orientation, imparts first spatial information on it, and emits a first modified light beam 1072 comprising the first spatial information and noise. The second microdisplay 1030 receives the second light beam 1064 and/or the third light beam 1066, rotates its polarization orientation, imparts second and/or third spatial information on it, and emits a second modified light beam 1074 comprising the second spatial information and noise and/or a third modified light beam 1076 comprising the third spatial information and noise. In accordance with this embodiment, the first, second and third spatial information may include polarized light.

The first and second analyzers 1035, 1040 are positioned to receive the first, second and/or third modified light beams 1072, 1074, 1076 from the polarizing beamsplitter 1010 and to enhance the contrast of the image. The first and second analyzers 1035, 1040 are configured to modify the light beams to produce polarized light oriented in a single plane (i.e., substantially linearly polarized light) which maybe accomplished by rotating the polarization axis of one or more of the light beams. In another exemplary embodiment, the analyzers 1035, 1040 may be configured to remove light of a predetermined wavelength from the light beams, depending on the characteristics of the filters (i.e., the color selective retardation elements).

In an exemplary embodiment, the first analyzer 1035 is positioned to receive the first modified light beam 1072 directly from the polarizing beamsplitter 1010 and configured to separate the first spatial information from the noise based on polarization. The first analyzer 1035 is configured to substantially transmit the first spatial information and to prevent or minimize transmission of noise, which comprises substantially non-polarized light or polarized light that is not oriented in the same manner as the desired spatial information. Similarly, the second analyzer 1040 is positioned to receive the second modified light beam 1074 and/or the third modified light beam 1076 directly from the polarizing beamsplitter 1010 and configured to separate the second and/or third spatial information from the noise based on polarization. The second analyzer 1040 is configured to substantially transmit the second and/or third spatial information and to prevent or minimize the transmission of noise, which comprises substantially non-polarized light or polarized light that is not oriented in the same manner as the desired spatial information. Because the first and second analyzers 1035, 1040 are positioned to receive the first, second and third modified light beams 1072, 1074, 1076 directly from the polarizing beam splitter 1010, prior to modification by any other optical elements, the first and second analyzers 1035, 1040 are capable of eliminating or minimizing substantially all of the noise imparted by the polarizing beamsplitter 1010 and the microdisplays 1020, 1030. Furthermore, by positioning the first and second analyzers 1035, 1040 to receive the modified light beams directly from the polarizing beamsplitter 1010, i.e., prior to the passage through or modification by other optical elements, the first and second analyzers 1035, 1040 are able to remove substantially all of the noise before the noise becomes indistinguishable, on the basis of polarization, from the light that comprises the desirable image. Accordingly, this embodiment produces images having dramatically improved levels of contrast relative to prior art systems.

In an exemplary embodiment, the light combiner 1045 is a dichroic cube. In other embodiment, the light combiner 1045 can be a polarizing beamsplitter or a dichroic beamsplitter.

The light combiner 1045 is positioned to receive filtered light beams from the first and second analyzers 1035, 1040 and is configured to substantially combine the filtered light beams to produce a filtered light output 1080. In an exemplary embodiment, the light combiner 1045 includes a polarizing beamsplitter that is positioned to receive the filtered light beams at a substantially 45 degree angle. Therefore, in accordance with this embodiment, the filtered light beams may be directed directly toward the light combiner 1045. The ability to use a single polarizing beamsplitter and to direct the filtered light beams directly toward the light combiner 1045, without the use of other elements to redirect the light beams, significantly reduces cost, complexity, and size relative to other color management systems.

The compensating prism group 1050 receives the filtered light output 1080, compensates for any optical aberrations induced by the light combiner 1045 and emit a compensated light output 1085 to the projection lens 1055, which projects an output light beam containing spatial information (i.e., an image) to a screen 1090.

Figure 11:
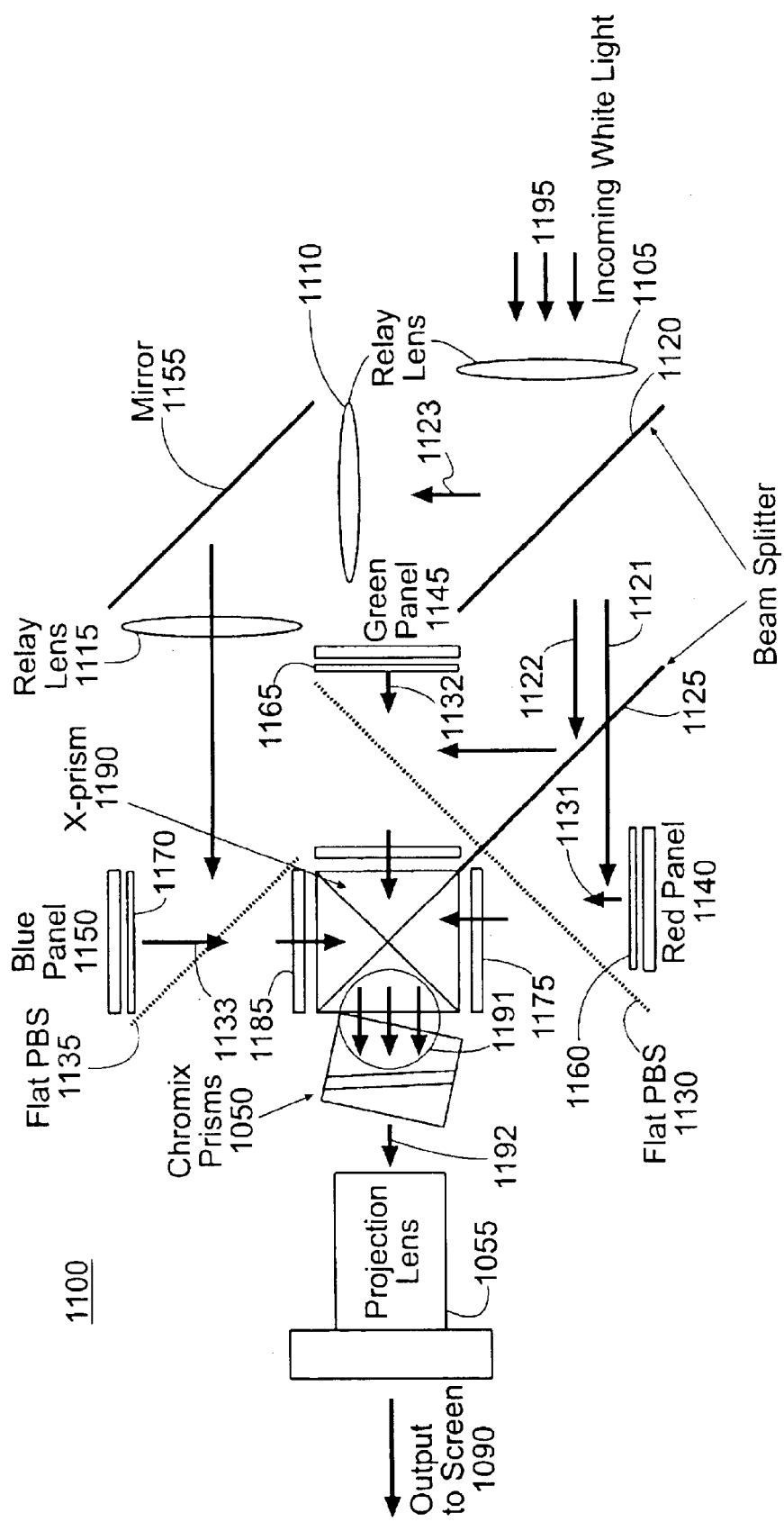
FIG. 11 illustrates a three-panel color management system including a compensating prism group positioned to receive the filtered light output from the light combiner and to compensates for any optical aberrations induced by the light combiner in accordance with another exemplary embodiment of the present invention.

With reference to FIG. 11, an exemplary color management system 1100 includes first, second and third relay lenses 1105, 1110, 1115, first and second dichroic beamsplitters 1120, 1125, first and second polarizing beamsplitter 1130, 1135, first, second and third microdisplays 1140, 1145, 1150, a mirror 1155, first, second and third retarders 1160, 1165, 1170, first, second and third analyzers 1175, 1180, 1185, a light combiner 1190, the compensating prism group 1050 and the projection lens 1055. In accordance with this embodiment, the first relay lens 1105 receives an input light beam 1195 from a white light source and transmits the input light beam 1195 to be received by the first dichroic beamsplitter 1120. The first dichroic beamsplitter 1120 transmits a first component 1121 and a second component 1122 to the second dichroic beamsplitter 1125, and reflects a third component 1123 to the second relay lens 1110. The first dichroic beamsplitter 1120 is configured to separate the first component 1121 from the second component 1122 and the third component 1123. The first dichroic beamsplitter 1120 may comprise a dichroic mirror, a dichroic prism coupled with an optical retarder, a plate dichroic beamsplitter, or a polarizing beamsplitter, which may further comprise a wire grid polarizer. The first dichroic beamsplitter 1120 may be configured for producing a red light output, a green light output, a blue light output and/or a cyan light output comprising green light and blue light. In one embodiment, the first component 1121 comprises a red component or light, the second component 1122 comprises a green component or light and the third component 1123 comprises a blue component or light.

The second dichroic beamsplitter 1125 is positioned to receive the first component 1121 from the first dichroic beamsplitter 1120 and transmit the first component 1121 to the first polarizing beamsplitter 1130. The first polarizing beamsplitter 1130 is configured to reflect the first component 1121 so that it is received by the first retarder 1160, which is used to correct for aberrations caused by the first polarizing beamsplitter 1130. The first retarder 1160 may have retardation values of approximately 3 nm to 500 nm. The first microdisplay 1140 receives the first component 1121 from the first retarder 1160, rotates its polarization orientation, imparts first spatial information on it, and emits a first modified light beam 1131, comprising the first spatial information and noise, toward the first analyzer 1175. In accordance with this embodiment, the first spatial information may include polarized light. In one embodiment, the first retarder 1160 may be configured to selectively modify the polarization of the first modified light beam 1131 emerging from the first microdisplay 1140 so that the emerging light is substantially linearly polarized and further so that the polarization axis for each color band is substantially the same as that of each other color band.

The second dichroic beamsplitter 1125 is positioned to receive the second component 1122 from the first dichroic beamsplitter 1120 and reflect the second component 1122 to the first polarizing beamsplitter 1130. The first polarizing beamsplitter 1130 is configured to reflect the second component 1122 so that it is received by the second retarder 1165, which is used to correct for aberrations caused by the first polarizing beamsplitter 1130 and/or the second microdisplay 1145. The second retarder 1165 may have retardation values of approximately 3 nm to 500 nm. The second microdisplay 1145 receives the second component 1122 from the second retarder 1165, rotates its polarization orientation, imparts second spatial information on it, and emits a second modified light beam 1132, comprising the second spatial information and noise, toward the second analyzer 1180. In accordance with this embodiment, the second spatial information may include polarized light. In one embodiment, the second retarder 1165 may be configured to selectively modify the polarization of the second modified light beam 1132 emerging from the second microdisplay 1145 so that the emerging light is substantially linearly polarized and further so that the polarization axis for each color band is substantially the same as that of each other color band.

The second relay lens 1110 is positioned to receive the third component 1123 and to transmit the third component 1123 to be received by the mirror 1155. The mirror 1155 is configured to reflect the third component 1123 to be received by the third relay lens 1115. The third relay lens 1115 is configured to transmit the third component 1123 to be received by the second polarizing beamsplitter 1135. The second polarizing beamsplitter 1135 is configured to reflect the third component 1123 so that it is received by the third retarder 1170, which is used to correct for aberrations caused by the second polarizing beamsplitter 1135 and/or the third microdisplay 1150. The third retarder 1170 may have retardation values of approximately 3 nm to 500 nm. The third microdisplay 1150 receives the third component 1123 from the third retarder 1170, rotates its polarization orientation, imparts third spatial information on it, and emits a third modified light beam 1133, comprising the third spatial information and noise, toward the third analyzer 1185. In accordance with this embodiment, the third spatial information may include polarized light. In one embodiment, the third retarder 1170 may be configured to selectively modify the polarization of the third modified light beam 1133 emerging from the third microdisplay 1150 so that the emerging light is substantially linearly polarized and further so that the polarization axis for each color band is substantially the same as that of each other color band.

The first, second and third analyzers 1175, 1180, 1185 are positioned to receive the first, second and third modified light beams 1131, 1132, 1133, respectively, from the polarizing beamsplitters 1130, 1135 and to enhance the contrast of the image. The first, second and third analyzers 1175, 1180, 1185 are configured to modify the light beams 1131, 1132, 1133 to produce polarized light oriented in a single plane (i.e., substantially linearly polarized light) which may be accomplished by rotating the polarization axis of one or more of the light beams. In another exemplary embodiment, the analyzers 1175, 1180, 1185 maybe configured to remove light of a predetermined wavelength from the light beams, depending on the characteristics of the filters (i.e., the color selective retardation elements).

In one embodiment, the first, second and third analyzers 1175, 1180, 1185 are positioned to receive the first, second and third modified light beam 1131, 1132, 1133 directly from the polarizing beamsplitters 1130, 1135 and configured to separate the first, second and third spatial information from the noise based on polarization. The first, second and third analyzers 1175, 1180, 1185 are configured to substantially transmit the first, second and third spatial information and to prevent or minimize transmission of noise, which comprises substantially non-polarized light or polarized light that is not oriented in the same manner as the desired spatial information. Because the first, second and third analyzers 1175, 1180, 1185 are positioned to receive the first, second and third modified light beams 1131, 1132, 1133 directly from the polarizing beam splitters 1130, 1135, prior to modification by any other optical elements, the first, second and third analyzers 1175, 1180, 1185 are capable of eliminating or minimizing substantially all of the noise imparted by the polarizing beamsplitters 1130, 1135 and the microdisplays 1140, 1145, 1150. Furthermore, by positioning the first, second and third analyzers 1175, 1180, 1185 to receive the modified light beams directly from the polarizing beamsplitters 1130, 1135, i.e., prior to the passage through or modification by other optical elements, the first, second and third analyzers 1175, 1180, 1185 are able to remove substantially all of the noise before the noise becomes indistinguishable, on the basis of polarization, from the light that comprises the desirable image. Accordingly, this embodiment produces images having dramatically improved levels of contrast relative to prior art systems.

The light beams emitted from the first, second and third analyzers 1175, 1180, 1185 are combined using the light combiner 1190, which emits a filtered light output 1191 to the compensating prism group 1050. In an exemplary embodiment, the light combiner 1190 is an x-prism. Where the light combiner 1190 is an x-prism, it may include one or more dichroic filters and may also,include a polarizing beamsplitter. It should be noted that an x-prism is an optical element having two planes that lie substantially orthogonal to one another. In an exemplary x-prism, a first plane is a dichroic filter configured to substantially transmit light having a first wavelength and to substantially reflect light having a second wavelength. In such an exemplary x-prism, a second plane, lying substantially orthogonal to the first plane, has a dichroic filter configured to substantially reflect light having the first wavelength and to substantially transmit light having the second wavelength. In another exemplary x-prism, a first plane is a dichroic filter configured to substantially transmit light having a first wavelength and to substantially reflect light having a second wavelength. In this exemplary x-prism, a second plane, lying substantially orthogonal to the first plane, has a polarizing beamsplitter configured to substantially reflect light oriented with a first polarization and to substantially transmit light oriented with a second polarization. In other embodiments, the light combiner 1190 may be, for example, one or more Philips prism, modified Philips prism, plumbicon prism, three-channel prism, recombining prism, and the like.

In an exemplary embodiment, the light combiner 1190 includes a polarizing beamsplitter that is positioned to receive the filtered light beams at a substantially 45 degree angle. Therefore, in accordance with this embodiment, the filtered light beams may be directed directly toward the light combiner 1190. The ability to use a single polarizing beamsplitter and to direct the filtered light beams directly toward the light combiner 1190, without the use of other elements to redirect the light beams, significantly reduces cost, complexity, and size relative to other color management systems.

The compensating prism group 1050 receives the filtered light output 1191, compensates for any optical aberrations caused by the light combiner 1190 and emit a compensated light output 1192 to the projection lens 1055, which projects an output light beam containing spatial information (i.e., an image) to the screen 1090.

Figure 12:
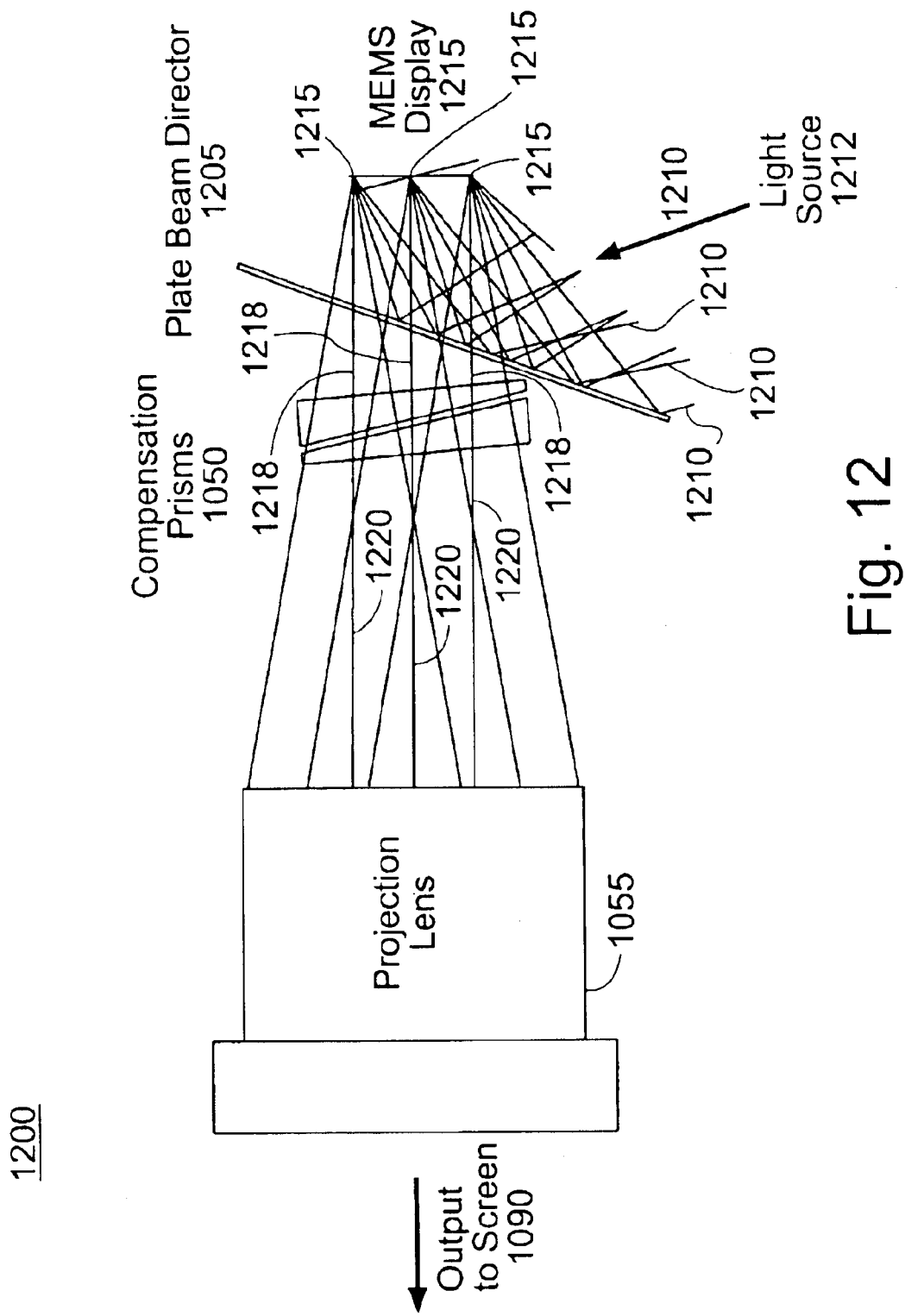
FIG. 12 illustrates a one-panel color management system including a beam director configured to receive light from a light source and configured to direct the light to a microelectromechanical systems display in accordance with another exemplary embodiment of the present invention.

FIG. 12 illustrates a one-panel color management system 1200 including a beam director 1205 configured to receive light 1210 from a light source 1212. The light 1210 can include one or more light beams. In one embodiment, the light 1210 includes a light beam 1210 that is modulated with primary colors (e.g., red, green, and blue) in order to create a color image or white light. The beam director 1205 transmits the light beam 1210 to a location on a microelectromechanical systems (MEMS) display 1215. The beam director 1205 can be a beamsplitter with or without a dichroic coating, a microstructure, a birefringent material or structure, a dichroic mirror, a dichroic prism coupled with an optical retarder, a plate dichroic beamsplitter, a polarizing beamsplitter or a wire grid polarizer or combinations thereof.

The MEMS display 1215 receives the light beam 1210 from the beam director 1205, imparts spatial information on it by means of polarization or directionality of the light beams, and emits modified light beams 1218 to the beam director 1205. The MEMS display 1215 can be a mirror, a micromirror device, a deformable mirror device (DMD), a digital light processing (DLP) device or any other device that selectively reflects the light beam 1210 based on one or more criteria. The criteria may include the polarization and the angle of reflection of the light beam 1210. The DMD device includes a plurality of small mirrors, all of which are contained on a common plane.

The modified light beams 1218 propagate through the beam director 1205 and to the compensating prism group 1050. In one embodiment, the beam director 1205 transmits one or more modified light beams 1218 exiting the MEMS display 1215, and reflects one or more unwanted modified light beams 1218 exiting the MEMS display 1215 which are outside a desired acceptance angle. The desired acceptance angle is measured from an axis or a plane that is normal or perpendicular to the common plane of or defined by the MEMS display 1215. The desired acceptance angle is measured from the MEMS display 1215 and is generally between −20 degrees to +20 degrees, preferably between −16 degrees to +16 degrees, more preferably between −12 degrees to +12 degrees, and most preferably between −10 degrees and +10 degrees. In one embodiment, the desired acceptance angle is dependent on the tilt angle of the plurality of small mirrors of the MEMS display 1215. The compensating prism group 1050 compensates or corrects for optical aberrations induced by the beam director 1205 and/or the MEMS display 1215 and emits compensated light beams 1220 to the projection lens 1055, which projects an image to the screen 1090.

The present invention has been described above with reference to various exemplary embodiments. However, those skilled in the art will recognize that changes and modifications may be made to the exemplary embodiments without departing from the scope of the present invention. For example, the various elements may be implemented in alternate ways, such as, for example, by providing other optical configurations or arrangements. These alternatives can be suitably selected depending upon the particular application or in consideration of any number of factors associated with the operation of the system. Moreover, these and other changes or modifications are intended to be included within the scope of the present invention, as expressed in the following claims.

What is claimed is:

1. A color management system, comprising:
   a beamsplitter positioned to receive a light beam;
   a microdisplay positioned to receive the light beam from the beamsplitter and emit a modified light beam to the beamsplitter; and
   a plurality of prisms positioned to receive the modified light beam from the beamsplitter and emit a light output that compensates for an optical aberration induced by the beamsplitter.

2. The color management system of claim 1, further comprising a filter positioned adjacent to the microdisplay and configured to compensate for an optical retardence of the beamsplitter and the microdisplay.

3. The color management system of claim 2, wherein the filter is an optical retarder element.

4. The color management system of claim 1, wherein the beamsplitter includes a dichroic thin film stack having a coating configured to separate the light beam into components of different colors.

5. The color management system of claim 1, wherein the beamsplitter is selected from a group consisting of a wire grid polarization beamsplitter, a dichroic beamsplitter and a cartesian beamsplitter.

6. The color management system of claim 1, wherein the plurality of prisms is a pair of prism compensators.

7. The color management system of claim 1, wherein the plurality of prisms are separated by a gap that is configured to compensate for one or more optical aberrations.

8. The color management system of claim 1, wherein at least one of the plurality of prisms has a tilted orientation relative to a line defined by the modified light beam.

9. The color management system of claim 1, wherein at least two of the plurality of prisms are substantially identical in shape.

10. An optical system, comprising:
    a first beamsplitter positioned to receive light from a light source and separate the light into a first light beam and a second light beam;
    a second beamsplitter having a first portion positioned to receive the first light beam and a second portion positioned to receive the second light beam;
    a first microdisplay positioned to receive the first light beam and emit a first modified light beam having first spatial information;
    a second microdisplay positioned to receive the second light beam and emit a second modified light beam having second spatial information;
    a light combiner positioned to receive the first and second modified light beams and emit a light output; and
    a plurality of prisms positioned to receive the light output from the light combiner and emit a compensated light output that compensates for an optical aberration induced by the light combiner.

11. The optical system of claim 10, wherein the first beamsplitter is selected from the group consisting of a dichroic mirror, a dichroic prism coupled with an optical retarder, a plate dichroic beamsplitter, a polarizing beamsplitter, a wire grid polarization beamsplitter, and combinations thereof.

12. The optical system of claim 10, wherein the second beamsplitter is selected from the group consisting of a polarizing beamsplitter, a wire grid polarization beamsplitter, a dichroic beamsplitter, a cartesian beamsplitter, and combinations thereof.

13. The optical system of claim 10, further comprising:
    a first retarder, positioned between the first portion of the second beamsplitter and the first microdisplay, for correcting an optical aberration caused by the second microdisplay; and
    a second retarder, positioned between the second portion of the second beamsplitter and the second microdisplay, for correcting an optical aberration caused by the second microdisplay.

14. The optical system of claim 10, wherein the light combiner is selected from the group consisting of a polarizing beamsplitter, a wire grid polarization beamsplitter, a dichroic beamsplitter, a dichroic cube, a cartesian beamsplitter, an x-prism, and combinations thereof.

15. The optical system of claim 10, wherein the plurality of prisms are separated by a gap that is configured to compensate for the optical aberration induced by the light combiner.

16. An optical system, comprising:
    a beam director positioned to receive light from a light source and emit a light beam;
    a microelectromechanical system (MEMS) display positioned to receive the light beam and emit a modified light beam to be received by the beam director; and
    a plurality of prisms positioned to receive the modified light beam and emit a light output that compensates for an optical aberration induced by the beam director.

17. The optical system of claim 16, wherein the beam director transmits the modified light beam exiting the MEMS display.

18. The optical system of claim 16, wherein the beam director is selected from the group consisting of a beamsplitter, a dichroic beamsplitter, a microstructure, a birefringent structure, a dichroic mirror, a dichroic prism, an optical retarder, an optical retarder, a polarizing beamsplitter, a wire grid polarizer, a cartesian beamsplitter, and combinations thereof.

19. The optical system of claim 16, wherein the microelectromechanical system (MEMS) display is selected from the group consisting of a mirror, a micromirror device, a deformable mirror device, a digital light processing device, and combinations thereof.

20. The optical system of claim 16, wherein at least one of the plurality of prisms has a tilted orientation relative to a line defined by the modified light beam.

21. The optical system of claim 16, wherein the beam director transmits the modified light beam exiting the MEMS display, and reflects unwanted modified light beams which are outside a desired acceptance angle.

22. The optical system of claim 21, wherein the desired acceptance angle is measured from the MEMS display and is between −20 degrees and +20 degrees.

* * * * *